Dec. 12, 1950     R. B. GETHMANN     2,534,119
HIGH-POTENTIAL COIL
Filed Jan. 26, 1948
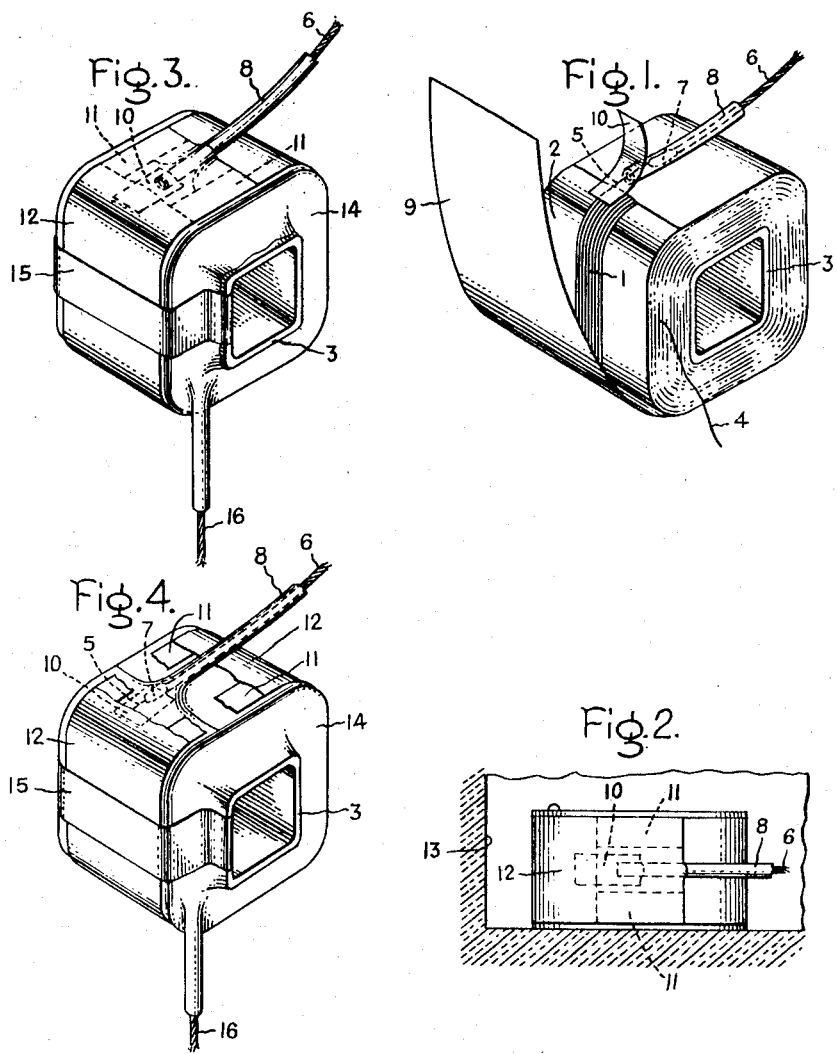
Inventor:
Richard B Gethmann,
by Merton D Mine
His Attorney.

Patented Dec. 12, 1950

2,534,119

UNITED STATES PATENT OFFICE 2,534,119

HIGH-POTENTIAL COIL

Richard Barton Gethmann, Bridgeport, Conn., assignor to General Electric Company, a corporation of New York Application January 26, 1948, Serial No. 4,349

3 Claims. (Cl. 175—21)

This invention relates to electrical coil assemblies and more particularly to such coils for use in radio system transformers and the like.

It is an object of this invention to provide such coil assemblies capable of withstanding relatively high potential surges and in which the dielectric properties are such that the distributed capacity therein is reduced to such a value that the assemblies may therefore be utilized at high frequencies.

A further object of this invention is to provide an electrical coil assembly that is capable of withstanding rough usage and which is impervious to moisture.

Yet another object of this invention is to provide a means for constructing an improved coil assembly for use in radio system transformers and the like.

The features of this invention which are believed to be new are set forth with particularity in the appended claims. The invention itself, however, together with further objects and advantages thereof may best be understood by reference to the accompanying drawing wherein, Fig. 1 shows the proposed coil assembly in the process of being assembled; Fig. 2 shows the assembly placed in a heating oven; Fig. 3 shows the completed coil assembly after it has been removed from the oven; and Fig. 4 shows an embodiment of the assembly similar to Fig. 1 with a portion of the insulation removed.

The present invention contemplates the provision of a coil assembly for use as radio transformer units and the like, the entire assembly being surrounded, insulated and protected by solid polyethylene, and in addition the various layers of coil conductors being insulated one from the other by polyethylene, the polyethylene further providing suitable protection for the soldered connections between the ends of the coil conductors and the lead-in wires.

It is proposed in accordance with the present invention to utilize strips of polyethylene sheet, and to wind the coils and the strips together about a coil form in such a way that each layer of coil conductors is separated by a strip or plurality of strips of polyethylene, a sufficient margin of the strips being allowed to extend beyond the layers of coil conductors. It has been found to be preferable to wind about a coil form, one or more layers of a strip of polyethylene sheet under the first layer of the coil winding, the outer layer of the coil winding being similarly covered with further layers of polyethylene strip. Heat resisting adhesive tape is used to secure the winding and polyethylene strips, and also to serve as a molding form for the polyethylene in a manner to be described. The assembly is then placed in a heating oven and heated until the polyethylene becomes molten. The assembly is then removed and cooled so that the polyethylene forms a solid mass protecting and insulating the assembly.

Referring now to Fig. 1, conductor layers 1 are shown to be interleaved by a strip of polyethylene sheet 2, the conductors and the polyethylene strip being wound about a coil form 3. It can be seen that the polyethylene strips 2 extend longitudinally well beyond the conductor layers 1. One end of the winding is brought out of the assembly by conductor 4 and the other end by conductor 5, these ends being connected to suitable leads in a manner to be described. In Fig. 1, the conductor 5 is shown connected to a lead 6 by means of a soldered joint 7. Lead 6 may be surrounded by a polyethylene tube 8, which is slipped into place and may completely surround joint 7 and a portion of conductor 5. A final strip of polyethylene 9, which may comprise several layers, has one end slipped under conductor 5, joint 7 and tube 8. A strip of adhesive heat resisting tape 10 is then placed over the exposed layers of conductors 1, and pressed into place over tube 8, joint 7 and one end of strip 9, holding these components firmly in place. The other end of the polyethylene strip 9 is brought around the coil and overlaps the first-mentioned end of this strip and covers joint 7, strip 10, and a portion of tube 8. Two narrow strips of heat resisting adhesive tape are then wound about the assembly, as shown in Fig. 3 at 11, hence securing the coil assembly in its present stage. A final layer of heat resisting adhesive tape is then wound around the assembly as shown in Fig. 3 at 12, the ends of this layer of tape overlapping as shown in this figure. The conductor 4 is connected to a further lead 16, as shown in Fig. 3, in substantially the same manner as the connection of conductor 5 to lead 6.

The assembly is then placed in an oven 13, as shown in Fig. 2, where it is held at a temperature of substantially 155° for approximately 20 minutes. The polyethylene is thereby formed into a coalescent mass surrounding the coil winding and separating the various layers of conductors, the heat resisting strip 12 acting as a mold therefor. At the above temperature the polyethylene is sufficiently viscous so that the coil does not become materially distorted, and when cooled this material forms into a solid mass.

The completed assembly is shown in Fig. 3, the polyethylene having cooled to form a solid mass 14 completely surrounding the coil and interleaving the conductor layers. The whole assembly is surrounded by heat resisting tape 12, which has acted as a mold, and now also serves as a protecting means for the coil. Supports 15 may be added, as shown, to serve as a further protection for leads 16 and 6 for the prevention of tearing of the insulation.

Fig. 4 is a further representation of the completed assembly, with a portion of the insulation removed to show clearly how the lead 6 is brought into connection with conductor 5, and how the polyethylene tubing 8 surrounding lead 6 has become integral with the solid polyethylene 14 surrounding the assembly.

Polyethylene is utilized in the present construction as it is obtainable in sheet form and has the additional feature of having a low melting point. These features greatly simplify the assembly process so that the coils may be efficiently and inexpensively produced. In addition polyethylene has the further advantage that it renders the coil impervious to moisture and also has good dielectric properties which reduce the distributed capacity of the coils, and permits their use at high frequencies. Coil assemblies constructed as described above have been found to be capable of withstanding potential surges up to 12,000 volts for one coil.

While a certain specific embodiment has been shown and described, it will, of course, be understood that various modifications may be made without departing from the invention. The appended claims are, therefore, intended to cover any such modifications as fall within the true spirit and scope of the invention.

What I claim as new and desire to secure by Letters Patent of the United States is:

1. An electrical coil assembly comprising a coil form having a coil wound thereabout, said coil being wound in a plurality of layers, solid polyethylene dividing and insulating said layers one from the other, said polyethylene extending longitudinally beyond said layers, lead wires connected to the ends of said coil, further solid polyethylene enclosing said entire coil assembly and forming an integral homogeneous mass with said first-mentioned solid polyethylene, heat resisting adhesive tape surrounding the periphery of said further solid polyethylene and acting as a protective means therefor, said lead wires extending from said further solid polyethylene and said adhesive tape.

2. An electrical coil assembly comprising a coil form having a coil wound thereabout, said coil being wound in a plurality of layers, solid polyethylene dividing and insulating said layers one from the other, said polyethylene extending longitudinally beyond said layers, lead wires connected to the ends of said coil, said lead wires being surrounded by polyethylene tubes, further solid polyethylene enclosing said entire coil assembly and forming an integral mass with said first-mentioned solid polyethylene, the ends of said polyethylene tubes adjacent said coil assembly forming an integral homogeneous mass with said further solid polyethylene, and said lead wires extending from the other ends of said polyethylene tubes.

3. An electrical coil assembly comprising a coil form having a coil wound thereabout, said coil being wound in a plurality of layers, solid polyethylene dividing and insulating said layers one from the other, said polyethylene extending longitudinally beyond said layers, lead wires connected to the ends of said coil, said lead wires being surrounded by polyethylene tubes, further solid polyethylene enclosing said entire coil assembly and forming an integral homogeneous mass with said first-mentioned solid polyethylene, heat resisting adhesive tape surrounding the periphery of said further solid polyethylene and acting as a protective means therefor, the ends of said polyethylene tubes adjacent said coil assembly forming an integral mass with said further solid polyethylene and said lead wires extending from said further solid polyethylene and from said adhesive tape through said polyethylene tubes.

RICHARD BARTON GETHMANN.

REFERENCES CITED

The following references are of record in the file of this patent:

UNITED STATES PATENTS

| Number | Name | Date |
|---|---|---|
| 1,470,337 | Thordarson | Oct. 9, 1923 |
| 1,633,577 | Franks | June 28, 1927 |
| 1,836,948 | Anderson | Dec. 15, 1931 |
| 2,195,233 | Boyer | Mar. 26, 1940 |
| 2,275,967 | Keillor et al. | Mar. 10, 1942 |

FOREIGN PATENTS

| Number | Country | Date |
|---|---|---|
| 595,657 | Great Britain | July 6, 1945 |

OTHER REFERENCES

Article: Some Recent Advances in Industrial Plastics, by Wearmouth, Journal of Scientific Instruments, September 1942, pages 129–133.

Plastics (Engineering Section), Polyethylene, pages 103–107, 174 and 176, August 1944.